United States Patent
Jo

(10) Patent No.: US 7,533,253 B2
(45) Date of Patent: May 12, 2009

(54) SYSTEM AND METHOD FOR FETCHING A BOOT CODE

(75) Inventor: Seong-Kue Jo, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 325 days.

(21) Appl. No.: 11/025,091

(22) Filed: Dec. 28, 2004

(65) Prior Publication Data

US 2006/0064575 A1 Mar. 23, 2006

(30) Foreign Application Priority Data

Sep. 23, 2004 (KR) ...................... 10-2004-0076495

(51) Int. Cl.
G06F 9/00 (2006.01)
G06F 15/177 (2006.01)

(52) U.S. Cl. ......................................... 713/2
(58) Field of Classification Search ................ 713/2
See application file for complete search history.

(56) References Cited

U.S. PATENT DOCUMENTS

| | | | | | |
|---|---|---|---|---|---|
| 5,479,498 | A | * | 12/1995 | Brandman et al. | 379/283 |
| 5,559,957 | A | * | 9/1996 | Balk | 714/23 |
| 6,016,522 | A | * | 1/2000 | Rossum | 710/52 |
| 6,459,651 | B1 | * | 10/2002 | Lee et al. | 365/233.13 |
| 6,611,523 | B2 | * | 8/2003 | Tanaka et al. | 370/395.5 |
| 6,665,737 | B2 | * | 12/2003 | Edwards | 710/3 |
| 7,177,200 | B2 | * | 2/2007 | Ronen et al. | 365/185.28 |
| 2002/0169898 | A1 | * | 11/2002 | Edwards | 710/5 |
| 2003/0126424 | A1 | * | 7/2003 | Horanzy et al. | 713/2 |
| 2003/0154471 | A1 | * | 8/2003 | Teachman et al. | 717/171 |
| 2006/0041711 | A1 | * | 2/2006 | Miura et al. | 711/103 |
| 2006/0184724 | A1 | * | 8/2006 | Meir et al. | 711/103 |

FOREIGN PATENT DOCUMENTS

JP 58-75229 5/1983

(Continued)

OTHER PUBLICATIONS

English language abstract of Japanese Publication No. 2001-056226.

(Continued)

*Primary Examiner*—Thomas Lee
*Assistant Examiner*—Mohammed H Rehman
(74) *Attorney, Agent, or Firm*—Marger Johnson & McCollom, P.C.

(57) ABSTRACT

A multi-chip system and a boot code fetch method include a nonvolatile memory chip storing a volatile memory chip, and a boot code, and a host fetching the boot code. The boot code is transferred to the volatile memory chip before the host fetches the boot code in the nonvolatile memory chip, and the boot code is fetched in the volatile memory chip. Therefore, a bootRAM of the conventional nonvolatile memory chip may be removed, so that an area of the nonvolatile memory chip can be reduced.

23 Claims, 4 Drawing Sheets

FOREIGN PATENT DOCUMENTS

| | | |
|---|---|---|
| JP | 61-147358 | 7/1986 |
| JP | 62-272341 | 11/1987 |
| JP | 63-058560 | 3/1988 |
| JP | 08-314801 | 11/1996 |
| JP | 11-298550 | 10/1999 |
| JP | 2001-056226 | 2/2001 |
| JP | 2003-037692 | 2/2003 |
| KR | 2000-0016908 | 3/2000 |
| KR | 2001-0056103 | 7/2001 |
| KR | 2003-0074106 | 9/2003 |
| KR | 2004-0064149 | 7/2004 |

OTHER PUBLICATIONS

English language abstract of Japanese Publication No. 2003-037692.
English language abstract of Korean Publication No. 2000-0016908.
English language abstract of Korean Publication No. 2001-0056103.
Samsung Electronics Co., Ltd. "NAND Flash Memory & SmartMedia" Samsung Device Solution Network Databook Sep. 2003, 2 pages.

* cited by examiner

SYSTEM AND METHOD FOR FETCHING A BOOT CODE

CROSS-REFERENCE TO RELATED APPLICATIONS

This U.S. non-provisional patent application claims priority under 35 U.S.C. §119 of Korean Patent Application 2004-0076495 filed on Sep. 23, 2004, the entire contents of which are hereby incorporated by reference.

BACKGROUND OF THE INVENTION

The invention relates to a multi-chip system, more specifically to a multi-chip system including a volatile memory chip and a nonvolatile memory chip and a boot code fetch method.

Generally, the multi-chip system comprises volatile memory chips such as a DRAM, and nonvolatile memory chip such as a PROM, EPROM, EEPROM, SRAM, and a flash memory. The volatile memory chip loses stored data when a power supply is cut off. However, the nonvolatile memory chip maintains the data even when the power supply is cut off. Therefore, the nonvolatile memory chip is used as a storage of a basic input/output system (BIOS), a boot code, etc. in various application areas (e.g., a computer system) having a strong possibility of being cut off from the power supply.

One example of a multi-chip system including a DRAM chip and a NAND flash memory chip is illustrated in FIG. 1. Referring to FIG. 1, the multi-chip system 10 includes a host 100, a DRAM chip 200, a NAND flash memory chip 300, and a system bus 11. In this case, the NAND flash memory chip 300 is disclosed in "NAND flash memory and Smart Media", on page 641 of a data book published by Samsung electronics. Co., Ltd. in September, 2003.

The host 100 includes a central processing unit 110 and a memory controller 111. The central processing unit (CPU) 110 fetches a boot code stored in the NAND flash memory chip 300 to perform an initialization operation at an initial power-up operation. The memory controller 111 controls entire operations of the DRAM chip 200 and the NAND flash memory chip 300. Especially, the memory controller 111 interfaces with a host interface unit 360 in the NAND flash memory chip 300, and provides various control signals (e.g., nCE, nOE, new, etc.) for the NAND flash memory chip 300.

The NAND flash memory chip 300 includes a NAND flash memory 310, a NAND flash interface unit 320, a bootRAM 330, a bootloader 350, and a host interface unit 360.

The NAND flash memory 310 comprises a large number of memory cells, and stores a boot code in a portion of the memory cells. The boot code stored in the NAND flash memory 310 is transferred to the bootRAM 330 via the NAND flash interface unit 320. The boot loader 350 provides a flash read command FR for the NAND flash interface unit 320, and a buffer write command BW for the bootRAM 330. In this case, the boot code stored in the NAND flash memory 310 is written in the bootRAM 330. Then, the bootloader 350 sends a buffer read command BR to the boot RAM 330. In this case, the boot code stored in the bootRAM 330 is transferred to the host 100 via the host interface unit 360.

In the multi-chip system 10, the host 100 fetches the boot code stored in the NAND flash memory chip 300 at an initial boot operation. In this case, the boot code should be fetched by the host 100 within a short time without a delay time. Therefore, the NAND flash memory chip 300 includes a bootRAM 330 having high operation speed. Before the host 100 fetches the boot code, the boot code is stored in the bootRAM 330. The host 100 is capable of performing the booting operation within a short time because the boot code is fetched in the bootRAM 330.

However, the bootRAM (e.g., an SRAM) 330 has a disadvantage of enlarging an area of the NAND flash memory chip 300. Because the bootRAM (e.g., an SRAM) 330 is in the NAND flash memory chip 300, it should be embodied as a design rule of the NAND flash memory. Therefore, the bootRAM 330 is larger than the SRAM in an area, so that an area of the NAND flash memory chip 300 is enlarged. Especially, as mobile systems tend to become more complicated, a size of the boot code increases. Therefore, the area increase of the bootRAM for storing the boot code becomes very burdensome, increasing design and manufacturing costs, and so on.

SUMMARY OF THE INVENTION

An aspect of the invention is to provide a multi-chip system with a reduced area of a nonvolatile memory chip by removing a bootRAM of the nonvolatile memory chip.

Another aspect of the invention is to provide a boot code fetch method of the multi-chip system capable of removing the bootRAM in the nonvolatile memory chip.

The invention is directed to a multi-chip system, comprising: a volatile memory chip; a nonvolatile memory chip storing a boot code; and a host fetching the boot code. In this case, before the host fetches the boot code, the nonvolatile memory chip transfers the boot code to the volatile memory chip.

In one exemplary embodiment, the volatile memory chip is a DRAM chip and the nonvolatile memory chip is a NAND flash memory chip. The NAND flash memory chip comprises: a NAND flash memory storing the boot code; a buffer memory storing the boot code read from the NAND flash memory; a mode register storing a mode register set (MRS) information on the DRAM chip; a DRAM interface unit making the NAND flash memory chip interact with the DRAM chip; and a DRAM boot controller controlling the boot code stored in the buffer memory to be transferred to the DRAM chip via the DRAM interface in response to the mode register set information.

The invention is directed to a boot code fetch method of a multi-chip system including a volatile memory chip, a nonvolatile memory chip storing the boot code, and a host fetching the boot code. The boot code fetch method of the multi-chip system comprises: a) transferring the boot code to the volatile memory chip; and b) the host fetching the boot code from the volatile memory chip.

In one exemplary embodiment, the volatile memory chip is a DRAM chip and the step a) comprises a step of setting a mode register of the DRAM chip.

In one exemplary embodiment, the volatile memory chip is a DRAM chip; and the nonvolatile memory chip is a NAND flash memory chip including a buffer memory and a DRAM interface unit. In this case, the step a) comprises: a1) storing the boot code in the buffer memory; a2) setting the mode register of the DRAM chip; and a3) transferring the boot code stored in the buffer memory to the DRAM chip via the DRAM interface unit.

A multi-chip system of the invention includes elements that transfer a boot code from a nonvolatile memory chip to a volatile memory chip before a host fetches the boot code. This is because a function of the bootRAM in a conventional nonvolatile memory chip is replaced by the volatile memory, thereby reducing an area of the nonvolatile memory chip. That is to say, the multi-chip system of the invention can remove the bootRAM of the conventional nonvolatile memory, so that an area of the nonvolatile memory chip may be drastically reduce.

BRIEF DESCRIPTION OF THE DRAWINGS

The accompanying drawings are included to provide a further understanding of the invention, and are incorporated in and constitute a part of this specification. The drawings illustrate example embodiments of the invention and, together with the description, serve to explain principles of the invention.

DETAILED DESCRIPTION OF PREFERRED EMBODIMENTS

Preferred embodiments of the invention will be described below in more detail with reference to the accompanying drawings. The invention may, however, be embodied in different forms and should not be constructed as limited to the embodiments set forth herein. Rather, these embodiments are provided so that this disclosure will be thorough and complete, and will fully convey the scope of the invention to those skilled in the art. Like numerals refer to like elements throughout the specification.

Figure 2:
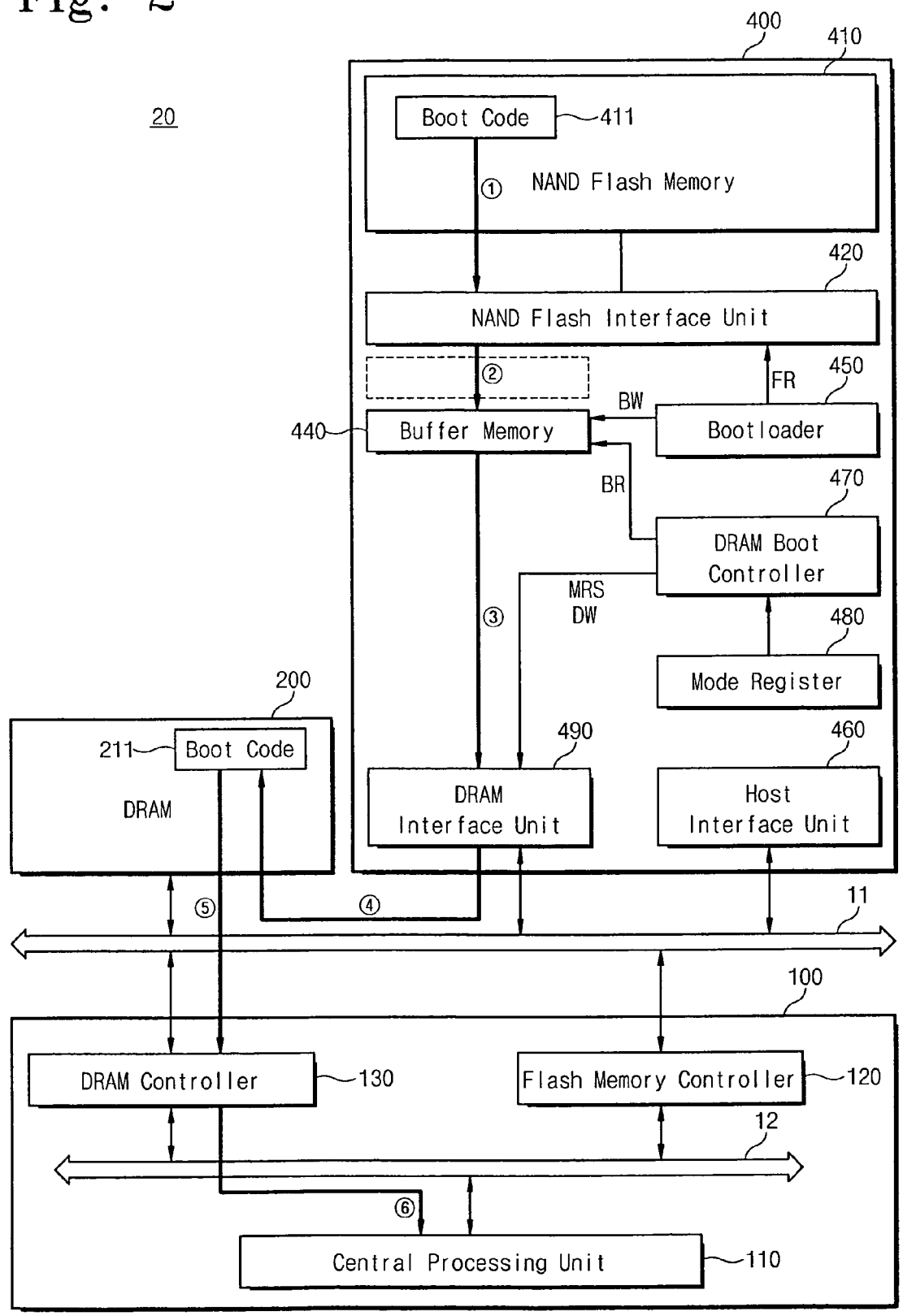
FIG. 2 is a block diagram of a multi-chip system in accordance with an exemplary embodiment of the invention.

FIG. 2 is a block diagram of a multi-chip system in accordance with an exemplary embodiment of the invention. Referring to FIG. 2, the multi-chip system 20 includes a host 100, a DRAM chip 200, and a NAND flash memory chip 400.

The host 100 includes a central processing unit (CPU) 110, a flash memory controller 120, a DRAM controller 130, and an external system bus 12. The CPU 110 performs an initialization operation by fetching a boot code at an initial power-up operation. The flash memory controller 120 controls entire operations of the NAND flash memory chip 400. Especially, the flash memory controller 120 interfaces with a host interface unit 460 in the NAND flash memory chip 400 and provides various control signals (e.g., nCE, nOE, nWE, etc.) for the NAND flash memory chip 400. The DRAM controller 130 controls entire operations of the DRAM chip 200. The DRAM controller 130 interfaces with a DRAM interface unit 490 in the NAND flash memory chip 400 to transfer a boot code from the NAND flash memory chip 400 to the DRAM chip 200.

The NAND flash memory chip 400 includes a NAND flash memory 410, a NAND flash interface unit 420, a buffer memory 440, a bootloader 450, a host interface unit 460, a DRAM boot controller 470, a mode register 480, and the DRAM interface unit 490.

Figure 1:
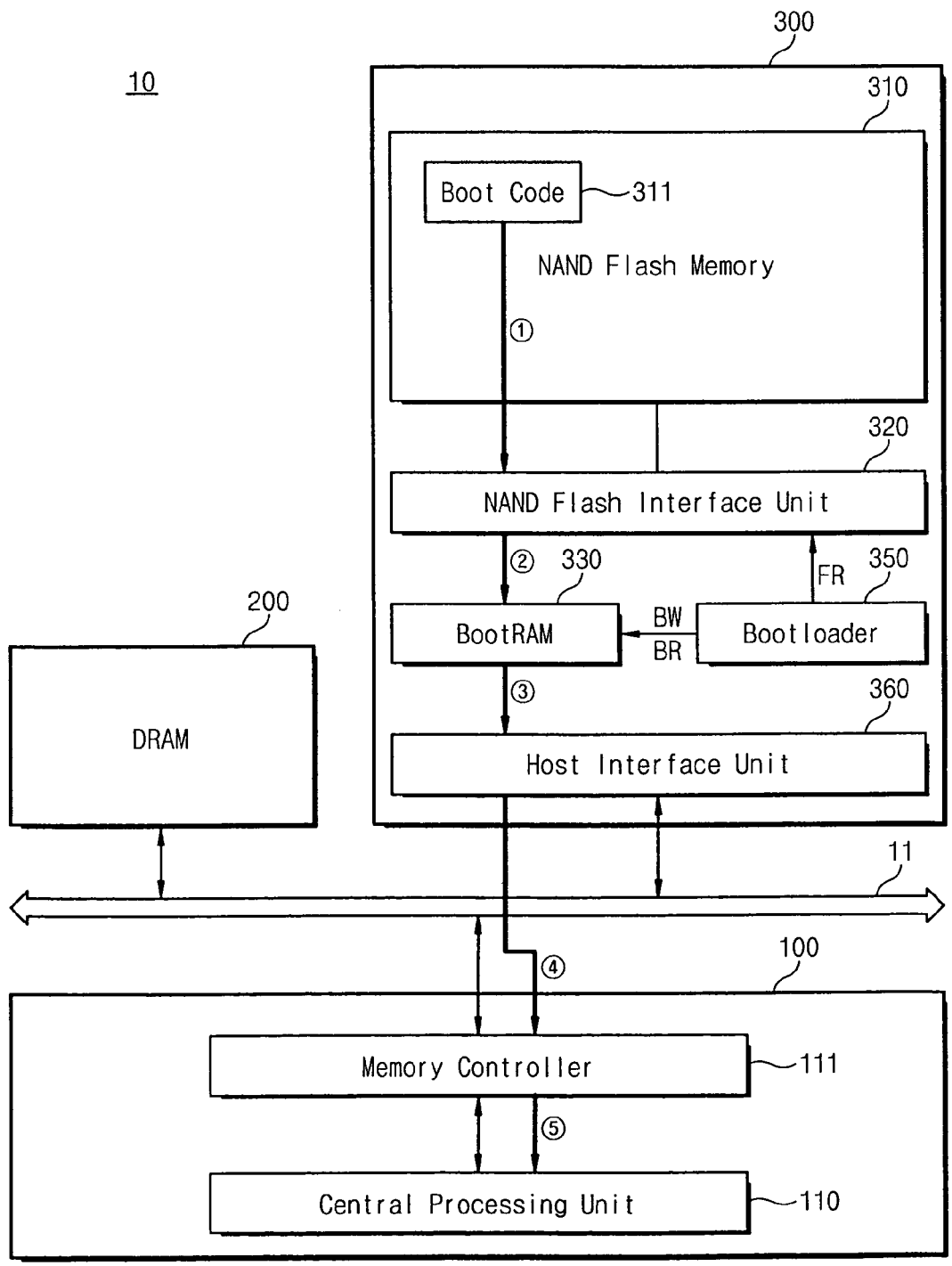
FIG. 1 is a block diagram of a multi-chip system in accordance with the prior art.

The NAND flash memory 410 comprises a large number of memory cells and stores the boot code in a portion 411 of the memory cells. The boot code stored in the NAND flash memory 410 is transferred to the buffer memory 440 via the NAND flash interface unit 420. Referring to FIG. 2, a bootRAM 330 in a conventional NAND flash memory chip 10 (in FIG. 1) is removed. The region where the conventional bootRAM once existed is marked with a dotted block in FIG. 2. That is, the boot code stored in the conventional bootRAM is stored in the buffer memory 440 in the invention. In this case, the buffer memory 440, which may be SRAM, temporarily stores the data stored in the NAND flash memory 410.

When a power is supplied at an initial stage, an external power detector (not shown) in the NAND flash memory chip 400 enables a power on reset signal (POR). When the power on reset signal is enabled, the bootloader 450 provides a flash read command FR for the NAND flash interface 420. Then, the bootloader 450 provides a buffer write command BW for the buffer memory 440. In this case, the boot code stored in the NAND flash memory 410 is written into the buffer memory 440.

The DRAM boot controller 470 controls the buffer memory 440 and the DRAM interface unit 490. The DRAM boot controller 470 provides a buffer read command BR for the buffer memory 440 and a DRAM write command DW for the DRAM interface unit 490. Therefore, the boot code stored in the buffer memory 440 transfers to the DRAM chip 200 via the DRAM interface unit 490.

Meanwhile, before the boot code is transferred to the DRAM chip 200, the DRAM boot controller 470 sends mode register set (MRS) information to the DRAM interface unit 490, thereby setting a mode register (not shown) in the DRAM chip 200. In this case, the MRS information includes a CAS latency CL, burst length BL, etc. to control various operation modes of the DRAM chip 200.

Generally, a host sets MRS information such as the CAS latency CL, burst length BL, etc. to the mode register (not shown) after the power-up. However, since the boot code is transferred before the host fetches the boot code, the host does not carry out the MRS setting. Therefore, before transferring the boot code, the MRS setting should be performed to determine operation conditions of the DRAM chip.

Referring to FIG. 2 again, the mode register 480 stores the MRS information on the NAND flash memory chip 400. The MRS information stored in the mode register 480 indicates a fuse, a bonding option, or the like. The DRAM boot controller 470 applies the MRS signal to the DRAM interface unit 490 in response to MRS information sent from the mode register 480.

Figure 3:
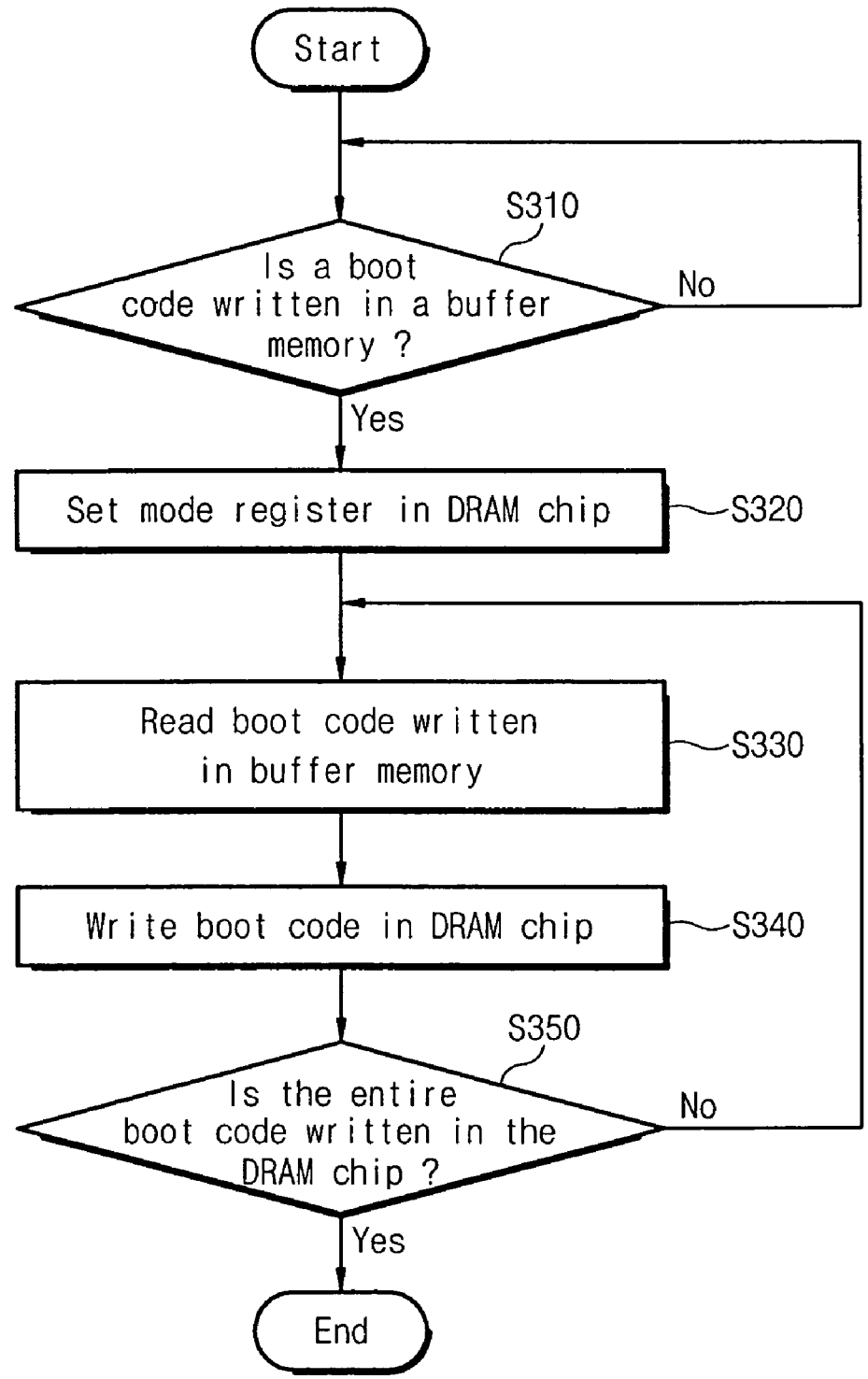
FIG. 3 is a flowchart of operations of a DRAM boot controller in FIG. 2.

FIG. 3 is a flow chart of the DRAM boot controller in FIG. 2. Referring to FIGS. 2 and 3, operations of the DRAM boot controller 470 is now explained.

First, in a step S310, an entire boot code is written into a buffer memory 440. The DRAM boot controller 470 confirms whether a flash read command FR and a buffer memory write command BW by a bootloader 450 are completed. When the write operation in the buffer memory 440 is completed, the process proceeds to a step S320.

In the step S320, a mode register in the DRAM chip 200 is set. The DRAM boot controller 470 provides an MRS signal for the DRAM interface unit 490 in response to the MRS information from the mode register 480. The mode register in the DRAM chip 200 is set by the MRS signal.

In a step S330, a boot code stored in a buffer memory 440 is read. The DRAM boot controller 470 sends a write command BR to the buffer memory 440.

In a step S340, the boot code read from the buffer memory 440 is written into the DRAM chip 200. The DRAM boot controller 470 provides a write command DW for the DRAM interface unit 490.

In a step S350, it is confirmed whether the entire boot code is written in the DRAM chip 200. If the entire boot code is not written in the DRAM chip 200, the DRAM boot controller 470 repeats the boot code read operation S330 and the boot code write operation S340. However, if the entire boot code is written in the DRAM chip 200, the DRAM boot controller stops its operations.

Referring to FIG. 2 again, a flow path of the boot code may be confirmed. The flow path of the boot code is marked with a thick solid line. The boot code is stored in the buffer memory 440 via the NAND flash interface unit 420 (①, ②, wherein circled numbers refer to flow path numbers in FIG. 2). Next, the boot code stored in the buffer memory 440 is stored in the DRAM chip 200 via the DRAM interface unit 490 (③, ④). The boot code stored in the DRAM chip 200 is fetched to the central processing unit 110 via the DRAM controller 130 (⑤, ⑥).

Figure 4:
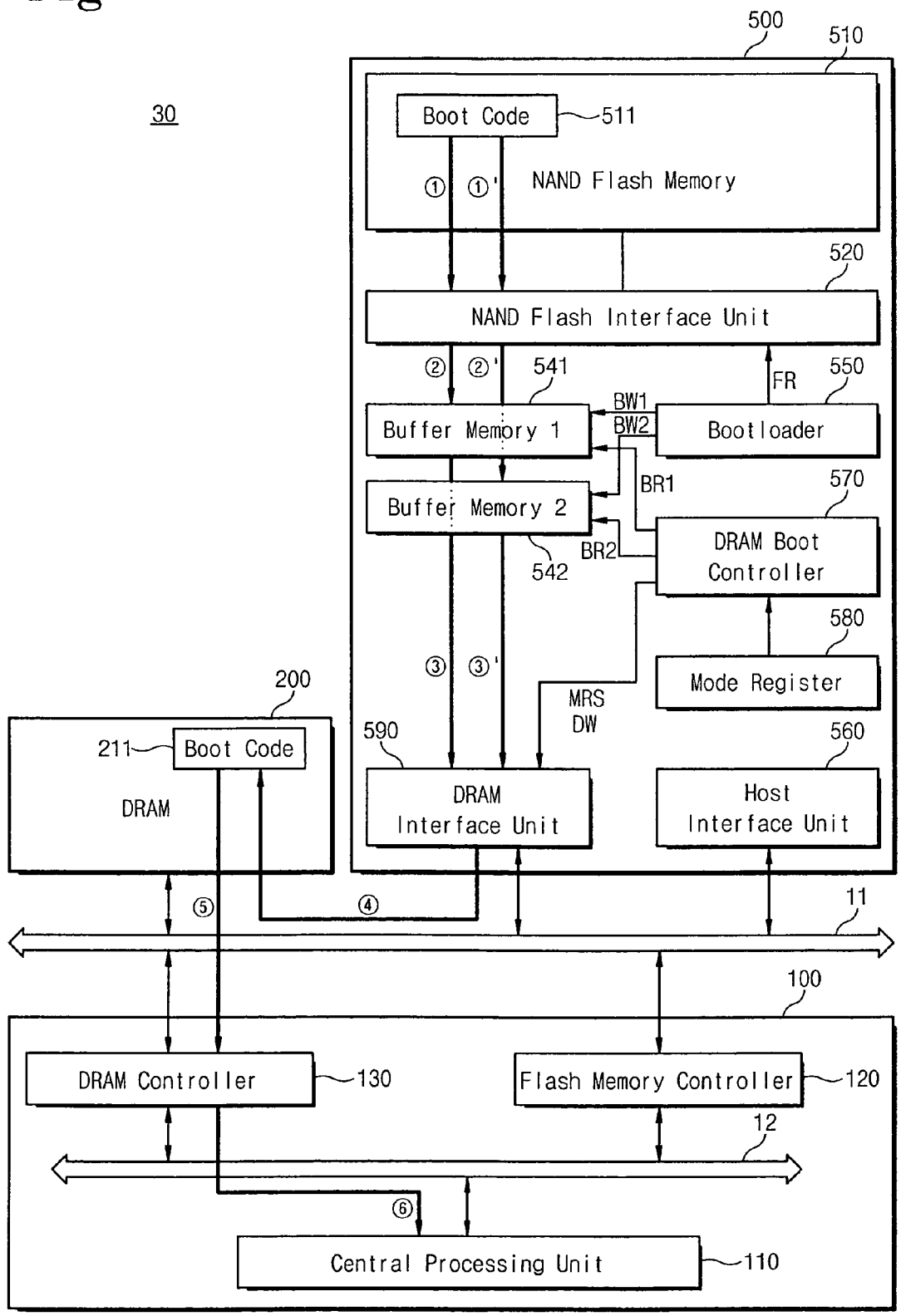
FIG. 4 is a block diagram of a multi-chip system in accordance with another exemplary embodiment of the invention.

FIG. 4 is a block diagram showing another exemplary embodiment of the multi-chip system in accordance with the invention. According to the exemplary embodiment, the multi-chip system 30 includes two buffer memories 541 and 542 in a NAND flash memory chip 500. This is for transferring a boot code quickly to a DRAM chip 200 by a dual buffering.

First, when a bootloader 550 sends a buffer write command BW1 to a first buffer memory 541, the boot code is written into the first buffer memory 541 via a NAND flash interface unit 520 (①, ②). Next, the bootloader 550 provides a buffer write command BW2 to the second buffer memory 542 and the DRAM boot controller 570 sends a buffer read command BR1 to the first buffer memory 541. While the boot code is written into the second buffer memory 542(①', ②'), the boot code stored in the first buffer memory 541 is read to be transferred to the DRAM chip 200 (③, ④). Then, the DRAM boot controller 570 sends a buffer read command BR2 to the second buffer memory 542 and a buffer write command BW1 to the first buffer memory 541. In this case, while the boot code stored in the second buffer memory 542 is read to be transferred to the DRAM chip 200 (③', ④'), the boot code is written in the first buffer memory 541 (①, ②). Thus, the boot code may be transferred to the DRAM chip 200 more quickly by the dual buffering According to the multi-chip system 30, the bootRAM (with reference to FIG. 1) 330 is removed to decrease an area of the NAND flash memory chip 500 and the transfer rate of the boot code can be increased by means of the dual buffering operation.

As described above, the multi-chip system of the invention and a method of fetching a boot code may remove a bootRAM of a nonvolatile memory chip because the boot code is transferred to a nonvolatile memory chip before a host fetches the boot code in the memory chip. Accordingly, the invention can solve problems of the conventional art due to an area increase of the bootRAM in the nonvolatile memory chip.

Although the invention has been described in connection with the embodiment of the invention illustrated in the accompanying drawings, it is not limited thereto. It will be apparent to those skilled in the art that various substitutions, modifications, and changes may be made without departing from the scope and spirit of the invention.

What is claimed is:

1. A boot code fetch method of a multi-chip system including a volatile memory chip, a nonvolatile memory chip that stores the boot code, and a host, comprising:

transferring the boot code from the nonvolatile memory chip to the volatile memory chip before any processor, including the host, loads or executes the boot code using a DRAM boot controller included in the nonvolatile memory chip;

before transferring the boot code from the nonvolatile memory chip to the volatile memory chip, setting a mode register in the volatile memory chip to control the volatile memory chip, wherein setting the mode register of the volatile chip is performed by the nonvolatile chip; and receiving the boot code by the host from the volatile memory chip, wherein the volatile memory chip, the nonvolatile memory chip, and the host are connected to a common system bus.

2. The method of claim 1, wherein the volatile memory chip is a DRAM chip, and wherein setting the mode register in the DRAM chip includes setting a latency operation mode and a burst length operation mode of the DRAM chip before transferring the boot code from the nonvolatile memory chip to the DRAM chip, and wherein setting the latency operation mode and the burst length operation mode is performed by the non-volatile memory chip.

3. The method of claim 2, wherein transferring the boot code comprises a step of setting a mode register in the DRAM chip to control the DRAM chip.

4. The method of claim 3, wherein the setting the mode register of the DRAM chip is performed by the nonvolatile memory chip.

5. The method of claim 4, wherein the nonvolatile memory chip is a NAND flash memory chip.

6. The method of claim 1, wherein the volatile memory chip is a DRAM chip; and the nonvolatile memory chip is a NAND flash memory chip including a buffer memory and a DRAM interface unit.

7. The method of claim 6, wherein transferring the boot code comprises:

storing the boot code in the buffer memory;

setting a mode register in the DRAM chip; and transferring the boot code stored in the buffer memory to the DRAM chip via the DRAM interface unit after the setting of the mode register.

8. The method of claim 7, wherein storing the boot code is performed at a power-up in response to a power on reset signal.

9. The method of claim 1, wherein all of the boot code received by the host is from the volatile memory chip.

10. The method of claim 1, wherein transferring the boot code to the volatile memory chip is performed by the non-volatile memory chip.

11. A multi-chip system, comprising:

a volatile memory chip;

a nonvolatile memory chip configured to store a boot code; and a host configured to fetch the boot code, wherein the nonvolatile memory chip is configured to set a mode register in the volatile memory chip including a latency operation mode and a burst length operation mode of the volatile memory chip prior to a transfer of the boot code to the volatile memory chip, and before any processor, including the host, fetches the boot code.

12. The system of claim 11, wherein the volatile memory chip is a DRAM chip.

13. The system of claim 11, wherein the nonvolatile memory chip is a NAND flash memory chip.

14. The system of claim 13, wherein the NAND flash memory chip comprises:

a NAND flash memory configured to store the boot code;

a buffer memory configured to store the boot code read from the NAND flash memory; and an interface unit configured to make the NAND flash memory chip interact with the volatile memory chip.

15. The system of claim 14, wherein a number of the buffer memory is more than one and the buffer memory performs a dual buffering.

16. The system of claim 14, wherein the buffer memory is an SRAM.

17. The system of claim 11, wherein the volatile memory chip is a DRAM chip, and
the nonvolatile memory chip is a NAND flash memory chip.

18. The system of claim 17, wherein the NAND flash memory chip comprises:
a NAND flash memory in which the boot code is stored;
a first buffer memory included in the NAND flash memory chip and configured to store a first portion of the boot code read from the NAND flash memory;
a second buffer memory included in the NAND flash memory chip and configured to store a second portion of the boot code read from the NAND flash memory;
a mode register configured to store a mode register set information on the DRAM chip;
a DRAM interface unit configured to make the NAND flash memory chip interact with the DRAM chip; and
a DRAM boot controller configured to:
control the boot code stored in the first buffer memory and the second buffer memory to be transferred to the DRAM chip via the DRAM interface unit in response to the mode register set information;
transfer the first portion of the boot code from the NAND flash memory chip to the first buffer memory included in the NAND flash memory chip prior to transferring the first portion of the boot code to the DRAM chip; and
transfer the second portion of the boot code from the NAND flash memory chip to the second buffer memory included in the NAND flash memory chip prior to transferring the second portion of the boot code to the DRAM chip, and prior to any processor, including the host, accessing the first and second portions of the boot code.

19. The system of claim 18, wherein a number of the buffer memory is more than one and the buffer memory performs a dual buffering.

20. The system of claim 18, further comprising:
a bootloader configured to control the NAND flash memory and the buffer memory to make the boot code that is stored in the NAND flash memory written into the buffer memory in response to a power-on reset signal at a power-up.

21. A boot code fetch method of a multi-chip system including a volatile DRAM memory chip, a flash memory chip including a NAND flash memory to store the boot code, and a host, the method comprising:
before accessing the boot code by any processor, including the host, transferring the boot code from the NAND flash memory to a DRAM interface unit via a first buffer memory and a second buffer memory using a DRAM boot controller located in the flash memory chip, wherein the DRAM interface unit, the first buffer memory, and the second buffer memory are included in the flash memory chip;
before transferring the boot code to any processor, including the host, transferring the boot code from the DRAM interface unit to the volatile DRAM memory chip;
before transferring the boot code from the DRAM interface unit to the volatile DRAM memory chip, setting a mode register in the volatile DRAM memory chip to control the DRAM memory chip, wherein setting the mode register of the volatile DRAM memory chip is performed by the flash memory chip; and
after transferring the boot code to the volatile memory chip, transferring the boot code to the host.

22. The method of claim 21, wherein the first buffer memory is included in the flash memory chip and separate from the volatile DRAM memory chip, the method further comprising:
transferring a first portion of the boot code from the NAND flash memory to the first buffer memory included in the flash memory chip prior to transferring the first portion of the boot code to the separate volatile DRAM memory chip;
transferring a second portion of the boot code from the NAND flash memory to the second buffer memory included in the flash memory chip prior to transferring the second portion of the boot code to the separate volatile DRAM memory chip, and prior to any processor, including the host, accessing the first and second portions of the boot code, wherein the second buffer memory is substantially equal in size to the first buffer memory;
reading the first portion of the boot code from the first buffer memory;
writing the first portion of the boot code to the separate volatile DRAM memory chip;
reading the second portion of the boot code from the second buffer memory; and
writing the second portion of the boot code to the separate volatile DRAM memory chip,
wherein the second portion of the boot code is transferred to the second buffer memory at substantially the same time as the reading and writing of the first portion of the boot code.

23. The method of claim 22, further comprising:
transferring a third portion of the boot code from the NAND flash memory to the first buffer memory,
wherein the third portion of the boot code is transferred to the first buffer memory at substantially the same time as the reading and writing of the second portion of the boot code.

* * * * *